United States Patent Office 3,345,189
Patented Oct. 3, 1967

3,345,189
CERAMIC DIELECTRICS
Shinobu Fujiwara, Minami-akita-gun, Akita-ken, and Takao Shiraiwa, Akita-shi, Japan, assignors to TDK Electronics Co., Ltd., Tokyo, Japan
Filed June 8, 1964, Ser. No. 373,315
Claims priority, application Japan, Oct. 30, 1963, 38/57,493
1 Claim. (Cl. 106—39)

ABSTRACT OF THE DISCLOSURE

The present invention provides ceramic dielectric materials in accordance with the invention wherein magnesium carbonate ($MgCO_3$) and antimony oxide ($Sb_2O_3$) are added to the basic composite comprising barium titanate ($BaTiO_3$), barium stannate ($BaSnO_3$) and calcium titanate ($CaTiO_3$).

Figure 1:
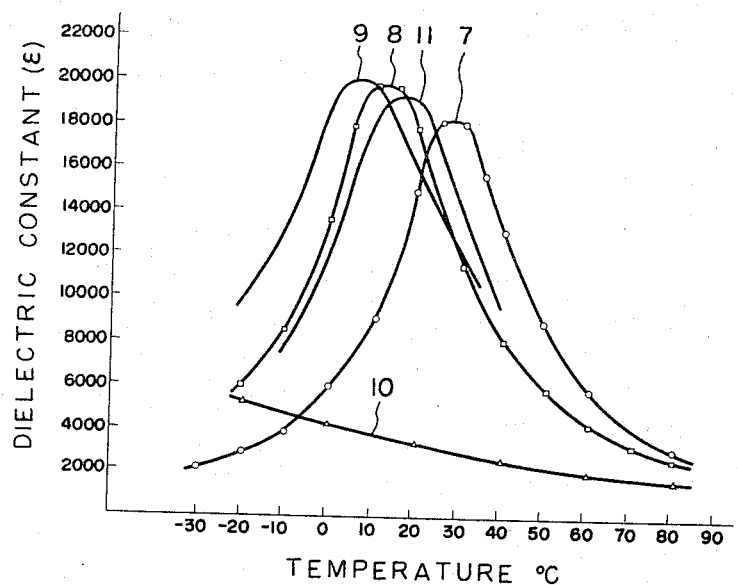

This invention relates to an improvement in ceramic dielectrics and an object of this invention is to provide ceramic dielectrics havng high value of dielectric constant.

Ceramic materials containing barium titanate or strontium titanate or mixtures of these titanate possesses usual dielectric properties. Their dielectric constant varies sharply with temperature in certain ranges, becoming very high at one or more critical temperature, known as Curie points. Above the primary Curie point dielectric losses become low.

For a dielectric having high value of dielectric constant, barium titanate ($BaTiO_3$) type ceramics have been widely used. The plot of dielectric constant against temperature for a typical element of barium titanate, indicates a peak close to 5000 at a temperature of approximately 120° C., this being the primary Curie point for this material and relatively small change in dielectric constant with temperature in room temperature range, whereas the value of its dielectric constant at room ambient temperature is small. Therefore, as strontium titanate ($SrTiO_3$) or barium stannate ($BaSnO_3$) etc., as the case may be, are added progressively in admixture with the barium titanate, the peak in dielectric constant at the Curie point shifts toward progressively lower temperature in room temperature range, for its high dielectric constant at a temperature in vicinity of such point, and its low dielectric loss above such point are used. And further, as calcium titanate etc. is added progressively in admixture with the barium titanate or the said mixture, the steep curve of temperature characteristics in vicinity of the Curie point is flattened progressively. Mass production of ceramic dielectrics of this type is, however, very difficult, because high sintering temperature is required, and the maximum value of dielectric constant which can be practically used is about 10,000 or so. In order to attain the super-minimization of dimensions in electric parts, being expected by the industry, further increase of dielectric constant is necessary.

According to the present invention, a ceramic dielectric which has usable dielectric constant ranging from 14,000 to 20,000 and requires extremely low sintering temperature is realized by adding both magnesium carbonate ($MgCO_3$) and antimony (III) oxide ($Sb_2O_3$) to the usual basic composite comprising barium titanate ($BaTiO_3$), barium stannate ($BaSnO_3$) and calcium titanate ($CaTiO_3$).

Properties and characteristics of the ceramic dielectrics of the present invention have been considered by systematically varying the amount of these additives, that is magnesium carbonate ($MgCO_3$) and antimony oxide ($Sb_2O_3$) and following results have been obtained. When the amount of magnesium carbonate ($MgCO_3$) is below 0.1 percent by weight, sintering temperature of more than 1400° C. is required and dielectric loss (tan $\delta$) becomes large. And when it exceeds 0.3 percent by weight, dielectric constant ($\epsilon$) at room temperature is less than 10,000 and temperature characteristic also becomes poor. When the amount of antimony oxide ($Sb_2O_3$) is below 0.1 percent by weight, high temperature of 1400° C. is required for sintering and when it exceeds 0.7 percent by weight, temperature range for sintering becomes narrow and the dielectric constant ($\epsilon$) at room temperature becomes small and the temperature characteristic becomes poor.

From the previous experiments, the best region of the amount of the said additives, that is magnesium carbonate ($MgCO_3$) and antimony oxide ($Sb_2O_3$), is decided as follows.

| | Percent by weight |
|---|---|
| $MgCO_3$ | 0.1–0.3 |
| $Sb_2O_3$ | 0.1–0.7 |

Values of the characteristics of the ceramic dieletrics according to the present invention are listed in following table. These ceramic dielectrics are prepared with following procedure: Take barium carbonate ($BaCO_3$), titanium (IV) oxide ($TiO_2$), tin (IV) oxide ($SnO_2$), calcium carbonate ($CaCO_3$), magnesium carbonate ($MgCO_3$) and antimony oxide ($Sb_2O_3$) in the various proportions as listed in the table, and wet-mix these raw materials such as by a ball-mill. Calcine the mixture of raw materials at a temperature of 1200° C. followed by disintegration of the calcined mixture and shaping thereof into a disc of 14 millimeters in diameter and 0.7 millimeter in thickness, and then sinter the disc.

The columns in the table relate respectively to numbers of specimens, to proportions of the said compositions, to final sintering temperatures, to the dielectric constants ($\epsilon$) at a temperature of 25° C., to the maximum values of dielectric constant at temperature ranging from minus 30° C. to plus 85° C., to dielectric losses (tan $\delta$) in percent and to Curie temperature in degree centigrade.

The dielectric constant ($\epsilon$) and dielectric loss (tan $\delta$) are measured by universal bridge at a frequency of 1 kilocycle per second and change in dielectric constant with temperature are measured in a temperature regulated bath ranging from minus 30° C. to plus 85° C.

TABLE

| Specimen No. | BaTiO$_3$ (Mol. Percent) | BaSnO$_3$ (Mol. Percent) | CaTiO$_3$ (Mol. Percent) | MgCO$_3$ (Weight Percent) | Sb$_2$O$_3$ (Weight Percent) | Sintering temp. (° C.) | ε (at 25° C.) | ε max. | Tan δ (Percent) | Curie point (° C.) |
|---|---|---|---|---|---|---|---|---|---|---|
| 1 | 86 | 9 | 5 | 0 | 0 | 1,410 | 12,000 | 19,800 | 5.4 | 38 |
| 2 | 88 | 9 | 3 | 0.1 | 0 | 1,405 | 14,700 | 14,700 | 2.0 | 25 |
| 3 | 89 | 9 | 2 | 0.3 | 0 | 1,405 | 8,500 | 9,600 | 2.0 | 10 |
| 4 | 89 | 9 | 2 | 0 | 0.1 | 1,390 | 14,500 | 15,500 | 4.1 | 34 |
| 5 | 89 | 9 | 2 | 0 | 0.7 | 1,370 | 13,300 | 14,000 | 4.8 | 15 |
| 6 | 84 | 9 | 7 | 0.1 | 0.1 | 1,370 | 14,500 | 14,800 | 2.0 | 28 |
| 7 | 84 | 9 | 7 | 0.1 | 0.2 | 1,360 | 18,500 | 18,500 | 1.8 | 27 |
| 8 | 84 | 9 | 7 | 0.1 | 0.5 | 1,360 | 14,400 | 20,000 | 1.3 | 12 |
| 9 | 84 | 9 | 7 | 0.1 | 0.7 | 1,330 | 14,000 | 20,000 | 0.4 | 5 |
| 10 | 84 | 9 | 7 | 0.1 | 1.0 | 1,330 | 3,100 | 6,000 | 0.9 | −30 |
| 11 | 84 | 9 | 7 | 0.1 | 0.4 | 1,350 | 17,000 | 19,400 | 1.5 | 16 |
| 12 | 86 | 7 | 7 | 0.2 | 0.4 | 1,330 | 16,300 | 16,300 | 1.2 | 25 |
| 13 | 84 | 9 | 7 | 0.3 | 0.4 | 1,330 | 14,200 | 14,800 | 1.0 | 20 |
| 14 | 84 | 9 | 7 | 0.4 | 0.4 | 1,330 | 9,000 | 12,200 | 0.8 | 10 |
| 15 | 84 | 9 | 7 | 0.4 | 0.8 | 1,330 | 4,900 | 18,000 | 0.4 | −20 |

Figure 2:
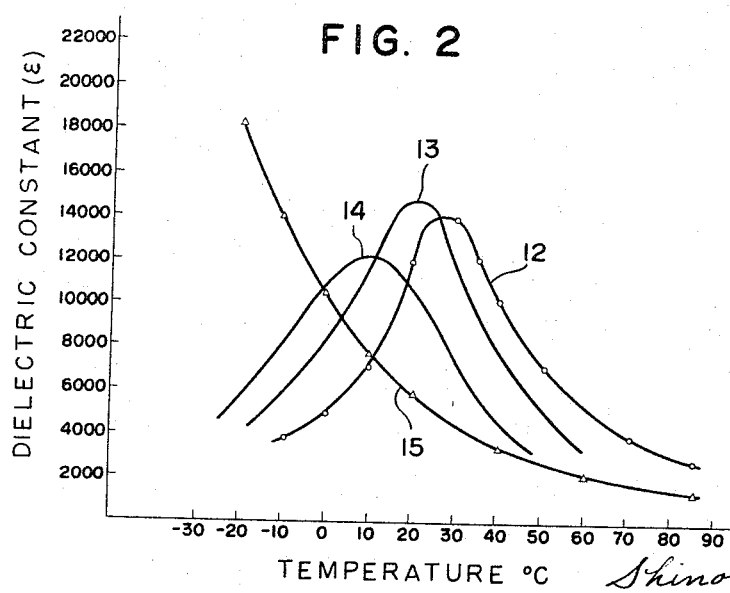

The object will be more apparent and the present invention will be more readily understood from the accompanying drawings, in which:

Both FIGURES 1 and 2 are plots of dielectric constant against temperature of the ceramic bodies in accordance with the present invention and indicating numbers of the curves in the drawings corresponding to the specimen number of the ceramic dielectric bodies in the above inserted table.

Example 0.1 percent by weight of magnesium carbonate (MgCO$_3$) and 0.7 percent by weight of antimony oxide (Sb$_2$O$_3$) are both added to a mixture of 84 molar percent of barium titanate (BaTiO$_3$), 9 molar percent of barium stannate (BaSnO$_3$) and 7 molar percent of calcium titanate (CaTiO$_3$) and are water ground together in a ball mill for sufficient time to produce homogeneous and fine powder.

The powder mixture of raw materials is calcined at a temperature of 1200° C. and is shaped after disintegration of the calcined mixture. And then the shaped materials are sintered at a temperature of 1330° C. A ceramic dielectric thus obtained shows the dielectric constant (ε) at 25° C. of 14,000, the maximum value of dielectric constant (ε$_{max}$) of 20,000, dielectric loss (tan δ) of 0.4 percent and Curie point of plus 5° C.

Thus, the ceramic dielectric according to the present invention has the characteristic feature of requiring low sintering temperature and having dielectric constant, at temperatures in certain ranges, of as high a value as 20,000. Thus, the super-minimization of the electric parts in various electronic circuit components is attainable by using above mentioned dielectric as a high dielectric constant type dielectric.

What is claimed is:

A ceramic dielectric material prepared by admixing about 0.1% by weight MgCO$_3$, about 0.7% by weight Sb$_2$O$_3$, about 84 molar percent BaTiO$_3$, about 9 molar percent BaSnO$_3$ and about 7 molar percent CaTiO$_3$, calcining the resultant mixture at a temperature of about 1200° C., shaping the mixture as desired, and subjecting the shaped material to a sintering temperature of about 1330° C.

References Cited

UNITED STATES PATENTS

| | | | |
|---|---|---|---|
| 2,402,515 | 6/1946 | Wainer | 106—39 |
| 2,402,518 | 6/1946 | Wainer | 106—39 |
| 2,777,773 | 1/1957 | Callahan | 106—39 |
| 3,268,783 | 8/1966 | Saburi | 317—258 |

OTHER REFERENCES

Coffeen: "Antimonates as Additives to Barium Titanate Dielectric Bodies," J. Am. Ceramic Soc., vol. 39, April 1956, pp. 154–158.

HELEN M. McCARTHY, *Primary Examiner.*